(12) United States Patent
Sugio

(10) Patent No.: US 9,969,085 B2
(45) Date of Patent: May 15, 2018

(54) ROBOT CONTROL DEVICE AND METHOD OF CONTROLLING SAME

(71) Applicant: FANUC CORPORATION, Yamanashi (JP)

(72) Inventor: Kenji Sugio, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days. days.

(21) Appl. No.: 15/655,612

(22) Filed: Jul. 20, 2017

(65) Prior Publication Data

US 2018/0029229 A1    Feb. 1, 2018

(30) Foreign Application Priority Data

Jul. 29, 2016 (JP) ................................ 2016-150113

(51) Int. Cl.
*G05B 19/04* (2006.01)
*B25J 9/16* (2006.01)

(52) U.S. Cl.
CPC .......... *B25J 9/1651* (2013.01); *B25J 9/1676* (2013.01); *G05B 2219/49138* (2013.01)

(58) Field of Classification Search
CPC .. G06F 19/00; G05D 13/00; B25J 9/18; B25J 5/00; G05B 19/04; H02P 1/00; H02P 3/00; H02P 6/00; H02P 23/00; H02P 1/26; H02P 6/06
USPC ........ 700/151, 245, 304; 901/1, 3, 8, 20, 23, 901/38, 41; 318/11, 568.11, 568.12, 318/568.2, 568.23, 574, 575, 595, 55, 66, 318/68, 69, 146, 147, 163, 400.07, 721, 318/779, 799, 257, 268, 369, 461
See application file for complete search history.

(56) References Cited

U.S. PATENT DOCUMENTS 7,391,178 B2 *   6/2008   Tanaka .................. B25J 9/1676
                                                        318/568.2
2006/0108960 A1   5/2006   Tanaka et al.
2010/0191372 A1   7/2010   Nihei et al.

FOREIGN PATENT DOCUMENTS

| EP | 1535706 A1 | 6/2005 |
|---|---|---|
| JP | 2008142841 | 6/2008 |
| JP | 4513568 B2 | 7/2010 |
| JP | 4648486 B | 3/2011 |

* cited by examiner

*Primary Examiner* — Antony M Paul
(74) *Attorney, Agent, or Firm* — Karceski IP Law, PLLC

(57) ABSTRACT

A control device for a robot, includes a speed calculator that calculates the speed of at least one target point of the robot operating according to an operation program, on the basis of a speed command value written in the operation program; a limitation direction specifier that specifies a direction in which the speed of the at least one target point is limited; a speed limit component calculator that calculates, out of the speed of the at least one target point calculated by the speed calculator, a speed component in the direction specified by the limitation direction specifier; and a speed limiter that limits, only upon motion exceeding a prespecified speed limit, a motion speed of the robot such that the speed component calculated by the speed limit component calculator is equal to or less than the prespecified speed limit.

6 Claims, 11 Drawing Sheets

ROBOT CONTROL DEVICE AND METHOD OF CONTROLLING SAME

CROSS-REFERENCE TO RELATED APPLICATIONS

This application claims the benefit of and priority to Japanese Patent Application No. 2016-150113, filed on Jul. 29, 2016, the entire content of which is incorporated herein by reference.

FIELD OF THE INVENTION

The present invention relates to a robot control device and a method of controlling the same.

BACKGROUND OF THE INVENTION

A robot control device is known which includes a detection device for detecting the position of an operator by sensing the weight of the operator and, in a mode where the operator teaches a robot, controls the robot by selecting a speed limit depending on the position of the operator detected by the detection device (see, for example, the Publication of Japanese Patent No. 4513568).

A production system is also known which preliminarily assigns a coordinated operation area between a robot and a person and, when the robot is in the coordinated operation area, limits the motion speed to lower than the maximum speed set for the position outside the coordinated operation area (see, for example, the Publication of Japanese Patent No. 4648486).

SUMMARY OF THE INVENTION

One aspect of the present invention is a robot control device including: a speed calculator that calculates the speed of at least one target point of a robot operating according to an operation program, on the basis of a speed command value written in the operation program; a limitation direction specifier that specifies a direction in which the speed of the target point is limited; a speed limit component calculator that calculates, out of the speed of the target point calculated by the speed calculator, a speed component in the direction specified by the limitation direction specifier; and a speed limiter that limits, only upon motion exceeding a prespecified speed limit, the motion speed of the robot such that the speed component calculated by the speed limit component calculator becomes at or below the prespecified speed limit.

Another aspect of the present invention is a robot control method including: a speed calculating step of calculating the speed of at least one target point of a robot operating according to a taught operation program, on the basis of a speed command value written in the operation program; a limitation direction specifying step of specifying a direction in which the speed of the target point is limited; a speed limit component calculating step of calculating, out of the speed of the target point calculated in the speed calculating step, a speed component in the direction specified in the limitation direction specifying step; and a speed limiting step of limiting, only upon motion exceeding a prespecified speed limit, the motion speed of the robot such that the speed component calculated in the speed limit component calculating step becomes at or below the prespecified speed limit.

DESCRIPTION OF EMBODIMENTS

A control device 1 and a control method for a robot 2 according to one embodiment of the present invention will now be described with reference to the drawings.

Figure 1:
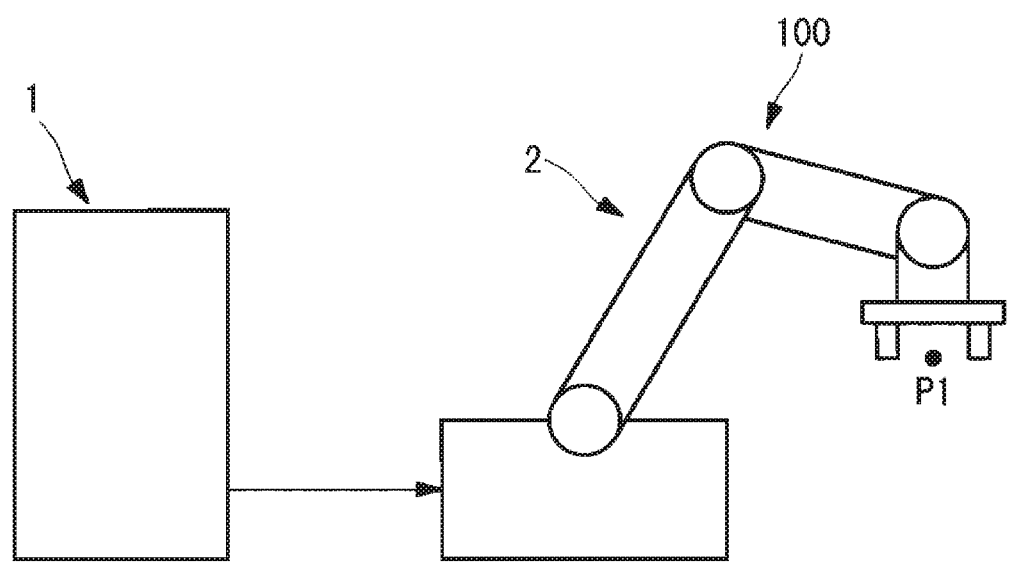
FIG. 1 is a diagram showing the overall configuration of a robot system including a robot control device according to one embodiment of the present invention.
Figure 2:
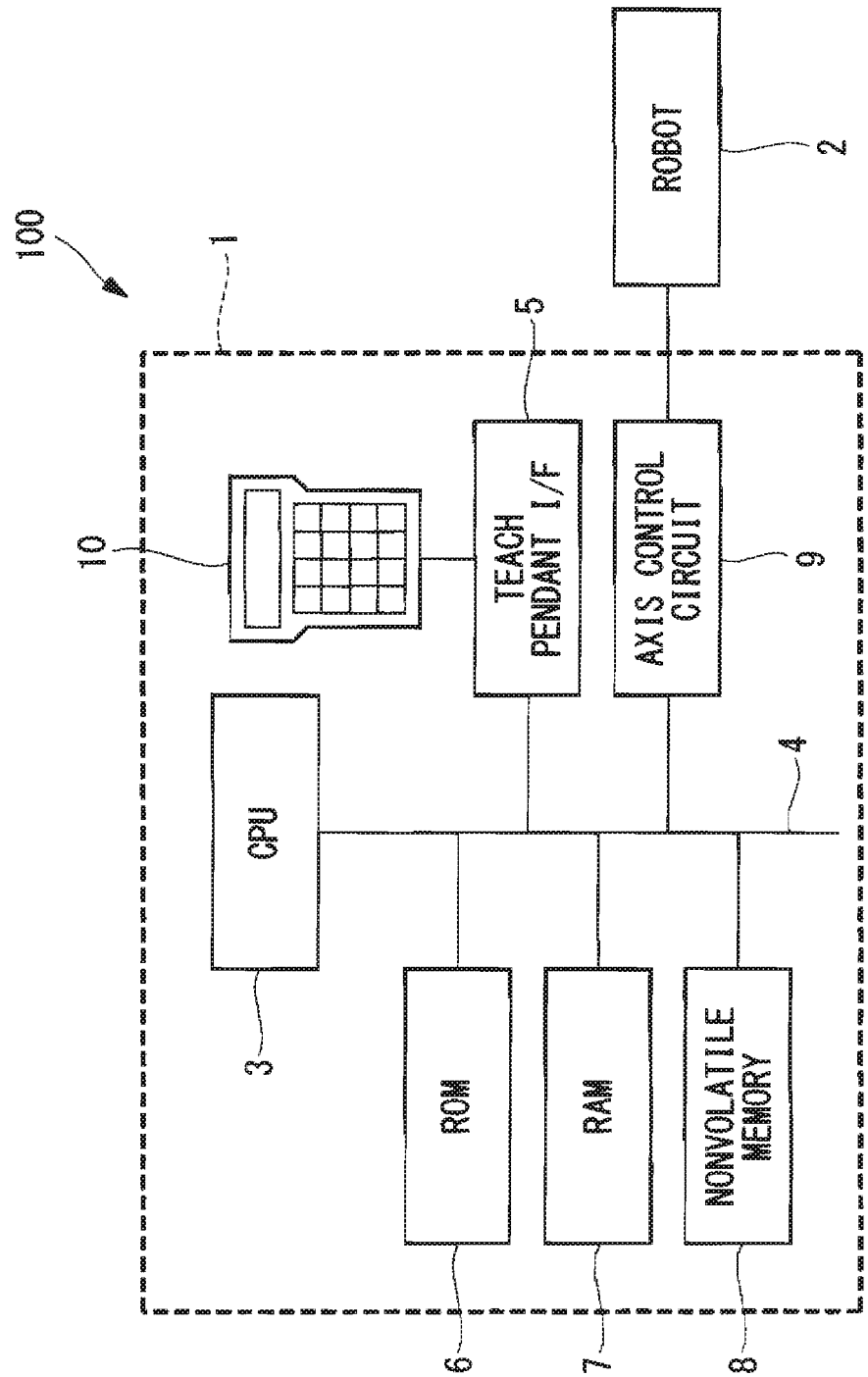
FIG. 2 is a diagram for explaining the hardware configuration of the robot control device in the robot system shown in FIG. 1.

As in a robot system 100 shown in FIG. 1, the control device 1 according to this embodiment is connected to the robot 2 which is a vertical articulated robot, for example, and controls the operation of the robot 2 in accordance with an operation program. As shown in FIG. 2, the control device 1 includes a CPU 3 and a teach pendant I/F 5, a ROM 6, a RAM 7, a nonvolatile memory 8, and an axis control circuit 9 which are connected, in parallel to each other, to a bus 4 connected to the CPU 3.

The teach pendant I/F 5 is connected to a teach pendant 10. The teach pendant 10 has a display function. The operator manually operates this teach pendant 10 to create, modify, and register the operation program for the robot 2, program various parameters, run the taught operation program, and conduct manual continuous feed, for example.

A system program supporting the basic functions of the robot 2 and the control device 1 is stored in the ROM 6. The operation programs for the robot 2 taught according to the application and the related specified data are stored in the nonvolatile memory 8. The RAM 7 is used as a storage area for temporally storing data for various computing operations in the CPU 3.

Upon reception of movement commands created by computing operations (trajectory planning and the associated interpolation, inverse transform, and the like) for robot control and feedback signals sent from pulsecoders (not shown in the drawing) provided to the respective axes, the axis control circuit 9 sends a torque command to a servo amplifier (not shown in the drawing) for operating the axes of the robot 2.

Figure 3:
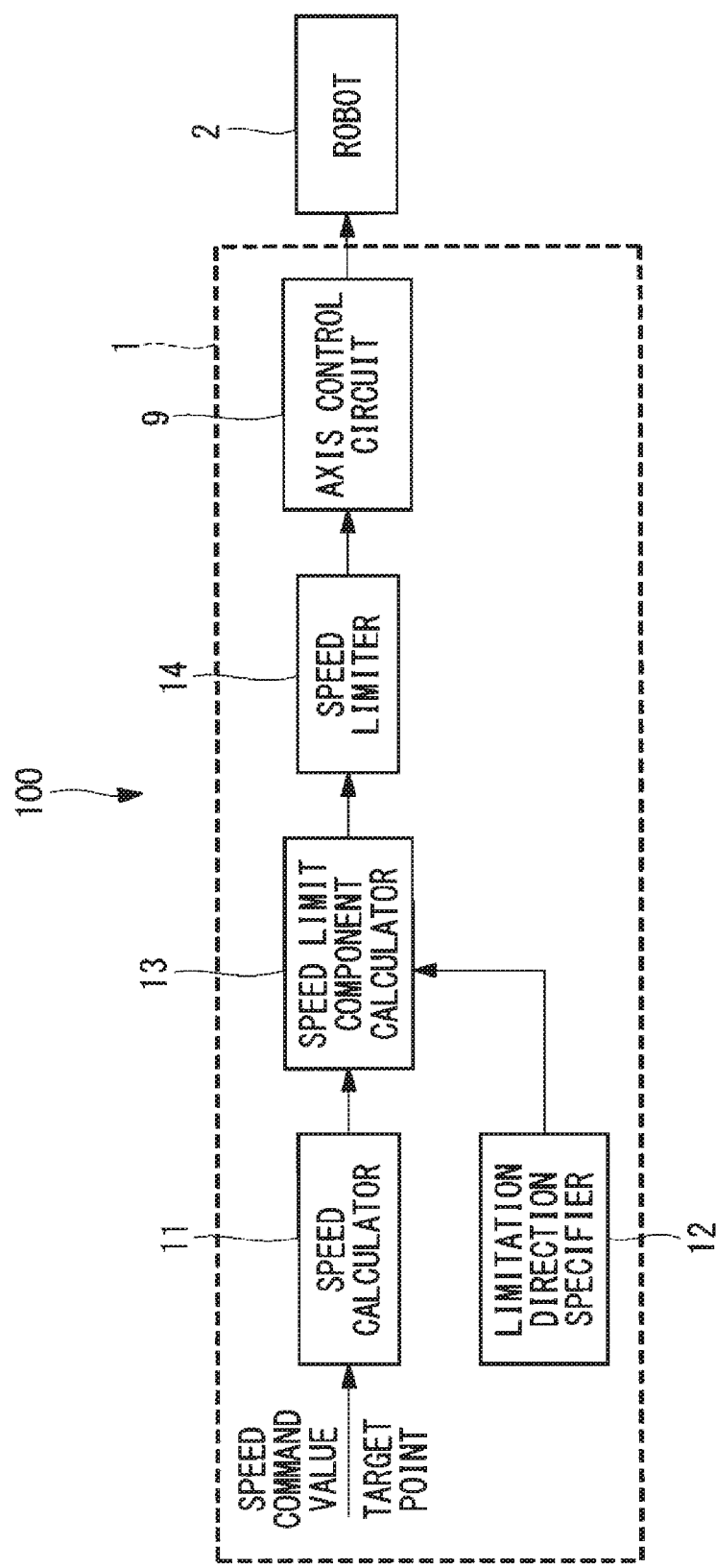
FIG. 3 is a block diagram showing the robot control device in the robot system in FIG. 1 by using function blocks.

In the control device 1 according to this embodiment, the function block shown in FIG. 3 is implemented by the aforementioned hardware structure.

To be specific, the control device 1 includes: a speed calculator 11 that calculates the speed of at least one target point P1 of the robot 2; a limitation direction specifier 12 that specifies the direction in which the speed of the target point P1 is limited; a speed limit component calculator 13 that calculates, out of the speed calculated by the speed calculator 11, the speed component in the direction specified by the limitation direction specifier 12; a speed limiter 14 that limits the motion speed of the robot 2; and the axis control circuit 9.

The speed calculator 11 is composed of the CPU 3 and calculates the speed of the target point P1 of the robot 2 in accordance with the speed command value assigned to each operation command in the operation program stored in the nonvolatile memory 8. The target point P1 of the robot 2 is, for example, a control point of the robot 2, such as a tool center point (TCP) specified in the operation program.

Figure 4:
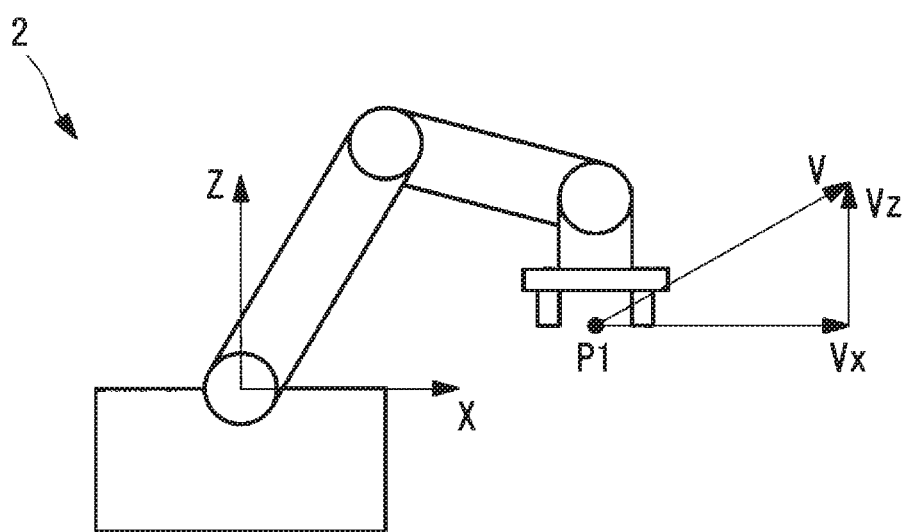
FIG. 4 is a diagram showing an example of the coordinate system in the robot system in FIG. 1 and the speed of the target point.

The limitation direction specifier 12 includes the teach pendant 10, the teach pendant I/F 5, and the nonvolatile memory 8. The operator operates the teach pendant 10 and specifies a given coordinate system. With the coordinate system, the direction in which the speed is limited is specified and stored in the nonvolatile memory 8. The coordinate system in the case shown in FIG. 4 is, for example, a reference coordinate system for the robot 2. In the drawing, V is the speed component of TCP, $V_X$ is the speed component of TCP in the X direction, and $V_Z$ is the speed component of TCP in the Z direction.

The speed limit component calculator 13 is composed of the CPU 3 and calculates, out of the speed of the target point calculated by the speed calculator 11, the speed component in the direction specified by the limitation direction specifier 12.

The speed limiter 14 is also composed of the CPU 3 and determines if the speed component calculated by the speed limit component calculator 13 exceeds a predetermined speed limit. Only if it exceeds the speed limit, a new speed command value for limiting the motion speed of the robot 2 is sent to the axis control circuit 9 such that the speed component decreases to at or below the speed limit.

How the control device 1 controls the robot 2 according to this embodiment having the aforementioned structure will now be explained.

Figure 5:
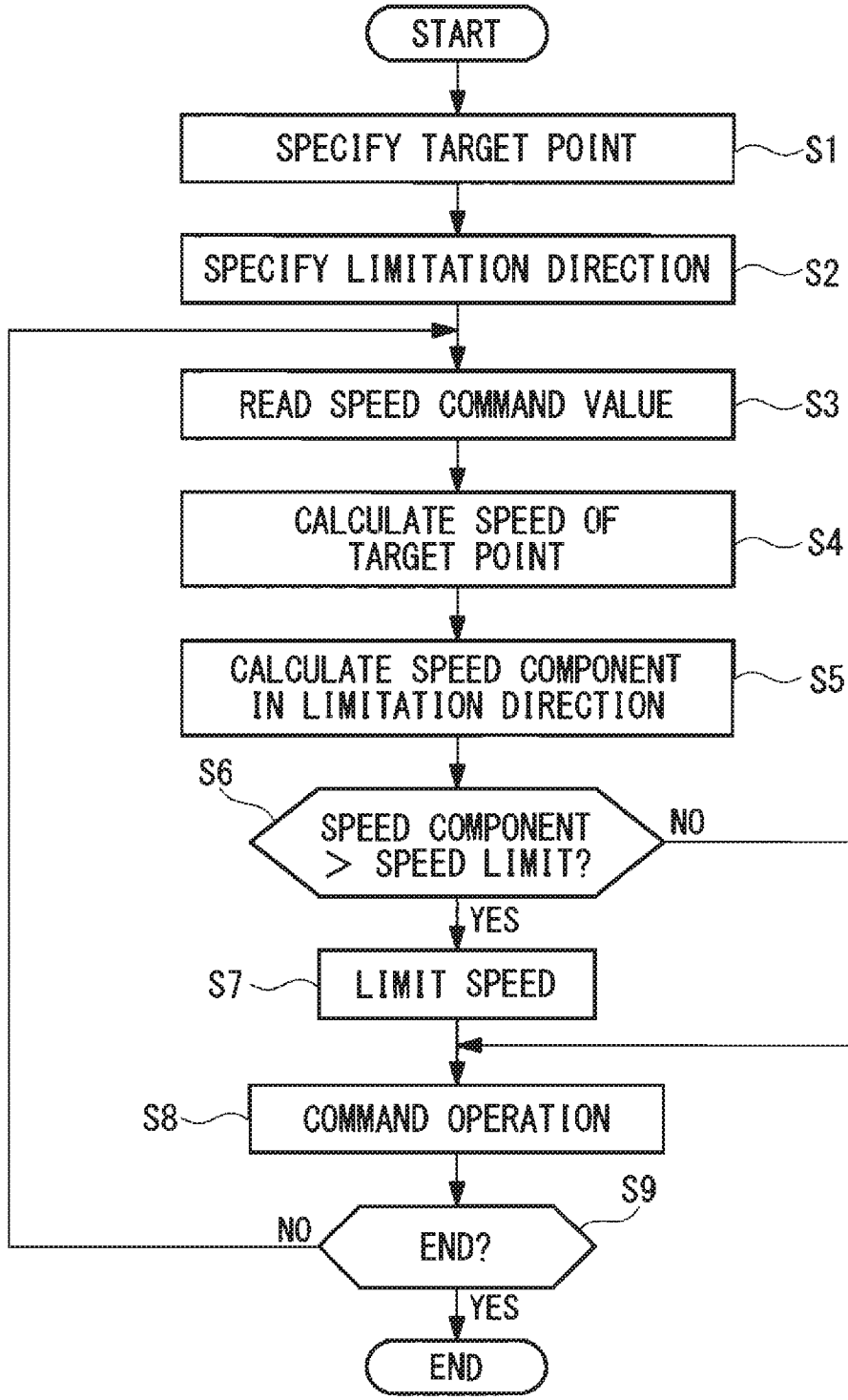
FIG. 5 is a flow chart for explaining a method of controlling the robot according to one embodiment of the present invention by using the robot control device shown in FIG. 1.

As shown in FIG. 5, in a method of controlling the robot 2 according to this embodiment, a TCP is specified (Step S1), a limitation direction in which the speed is limited is specified (Step S2 of specifying a limitation direction), a speed command value is read from the operation program upon reception of each operation command (Step S3), and the speed of the TCP is calculated (Step S4 of calculating speed).

Subsequently, the speed component of the TCP of the limitation direction specified in Step S2 of specifying the limitation direction is calculated (Step S5 of calculating a speed limit component), and whether the calculated speed component is greater than the predetermined speed limit is determined (Step S6). If the speed component is greater than the speed limit, the speed is limited and a new speed command value is calculated (Step S7 of limiting speed). If the speed component is at or below the speed limit, the operation command is executed without changing the speed command value specified in the operation program (Step S8).

In Step S7 of limiting speed, a new speed command value is calculated by the following formula.

$$V_{new} = V_{old} \times V_{Lim}/V_x$$

Here, $V_{new}$ is a new speed command value, $V_{old}$ is a speed command value specified in the operation program, and $V_{Lim}$ is a speed limit.

Afterwards, if all the operation commands are done is determined (Step S9). If not, the process is repeated again from Step S3.

In this manner, with the control device 1 for the robot 2 according to this embodiment and the method of controlling the robot 2, the motion speed of the robot 2 is limited only if the speed component of the TCP of the robot 2 in a direction prespecified by the operator exceeds the speed limit. Accordingly, unlike with conventional robot control devices or the like that uniformly limit the motion speed upon entry to a predetermined area, the speed is limited in limited conditions, giving an advantage of an improvement in the work efficiency of the robot 2.

This embodiment limits the speed component of the motion of the robot 2 in a specified direction for all areas. Alternatively, the speed component of the motion in a specified direction may be limited only for a prespecified area.

Figure 6:
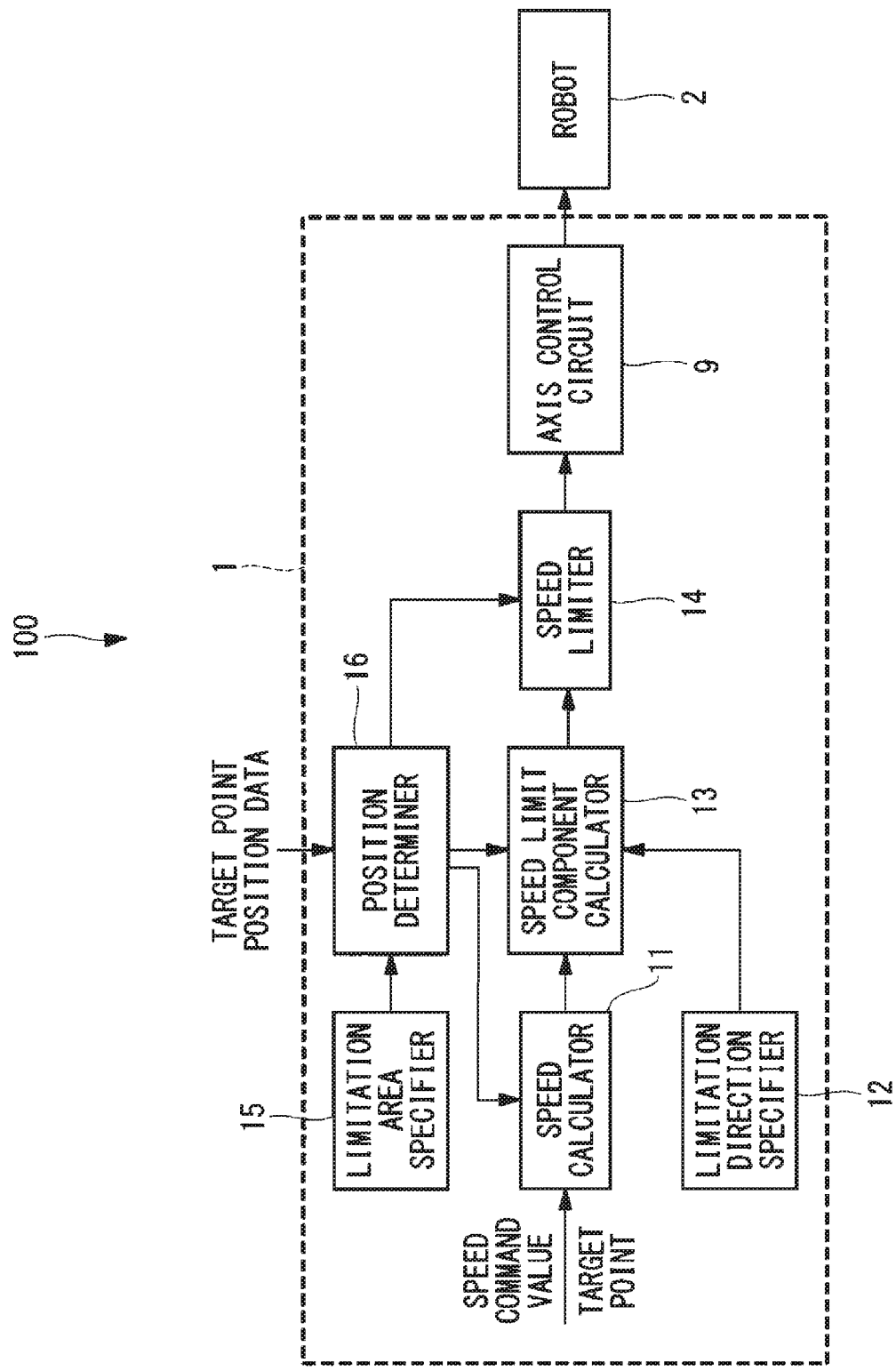
FIG. 6 is a block diagram showing the first modification of the robot control device shown in FIG. 3.

For example, as shown in FIG. 6, a limitation area specifier 15 that specifies a limitation area in which the motion speed is limited, and a position determiner 16 that determines if the target point P1 is located in the limitation area in accordance with the position data of the target point P1 of the robot 2 may be provided.

Figure 7:
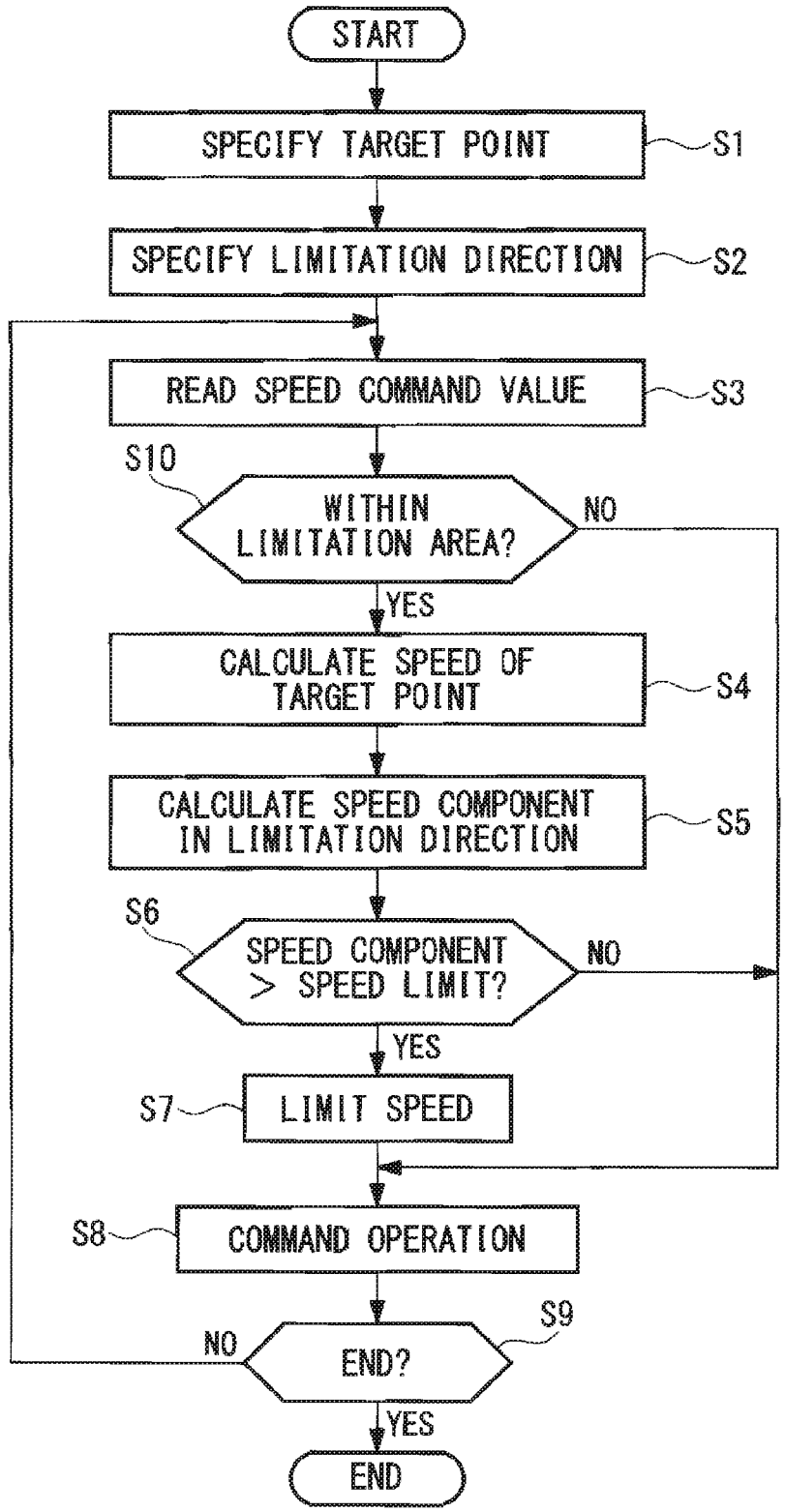
FIG. 7 is a flow chart for explaining the first modification of the robot control method shown in FIG. 5.

Hence, as shown in FIG. 7, if the position determiner 16 determines that the target point P1 is located in the limitation area (Step S10), the speed calculator 11 calculates the speed of the target point P1 (Step S4 of calculating speed), the speed limit component calculator 13 calculates the speed component in the limitation direction (Step S5 of calculating a speed limit component), and the speed limiter 14 limits the motion speed (Step S6). In contrast, if the position determiner 16 determines that the target point P1 is out of the limitation area (Step S10), Steps S4 to S7 for limiting motion are skipped and a speed command based on the speed command value of the operation program is output (Step S9).

Accordingly, only if the target point P1 is located in the limitation area specified by the operator, the motion speed is limited such that the speed component in the limitation direction becomes at or below the speed limit; thus, the motion speed is limited in further limited cases, giving an advantage of an improvement in the work efficiency of the robot 2.

The position data of the target point P1 may be detected by a sensor not shown in the drawing or calculated by an operation program.

Figure 8:
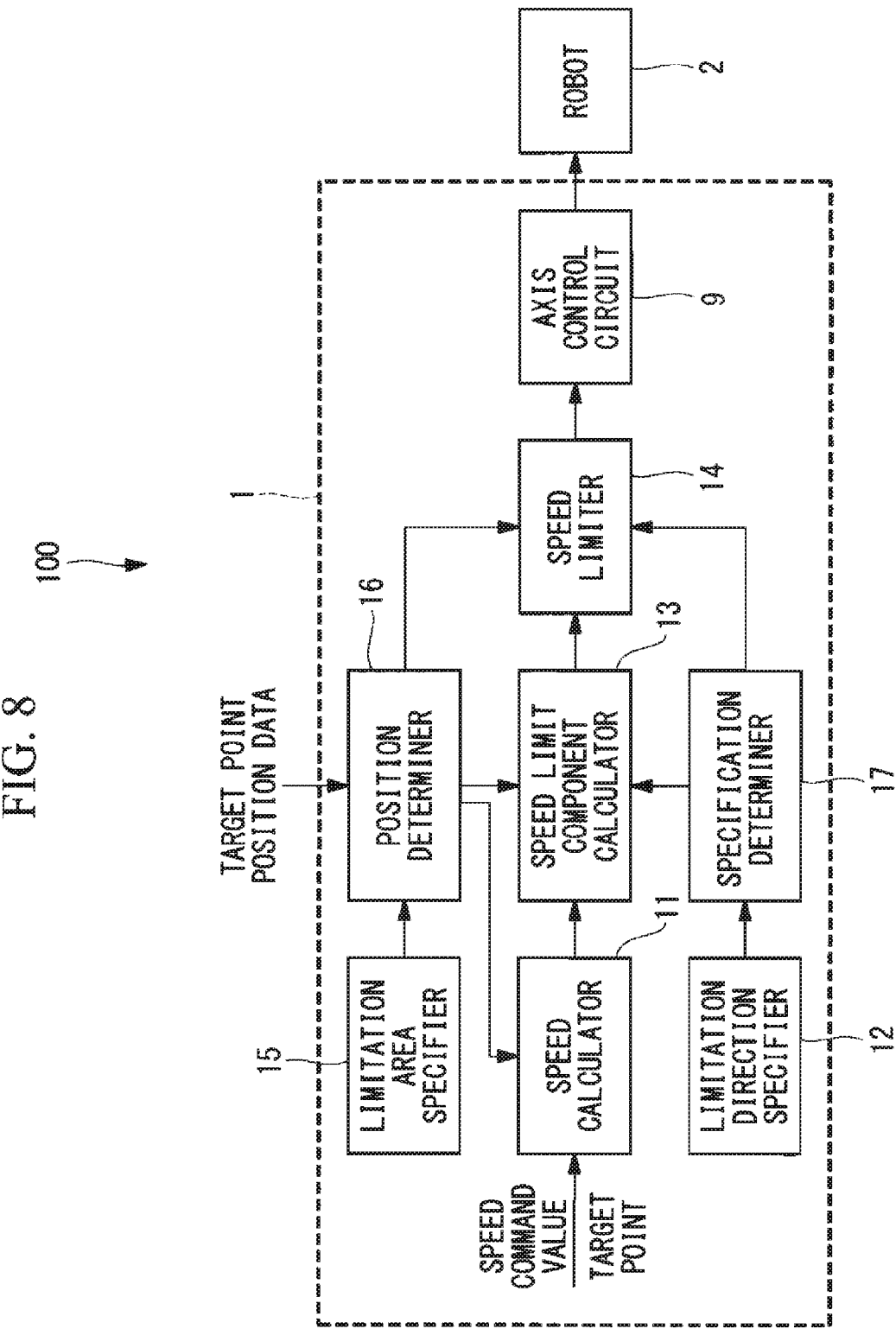
FIG. 8 is a block diagram of the second modification of the robot control device shown in FIG. 3.
Figure 9:
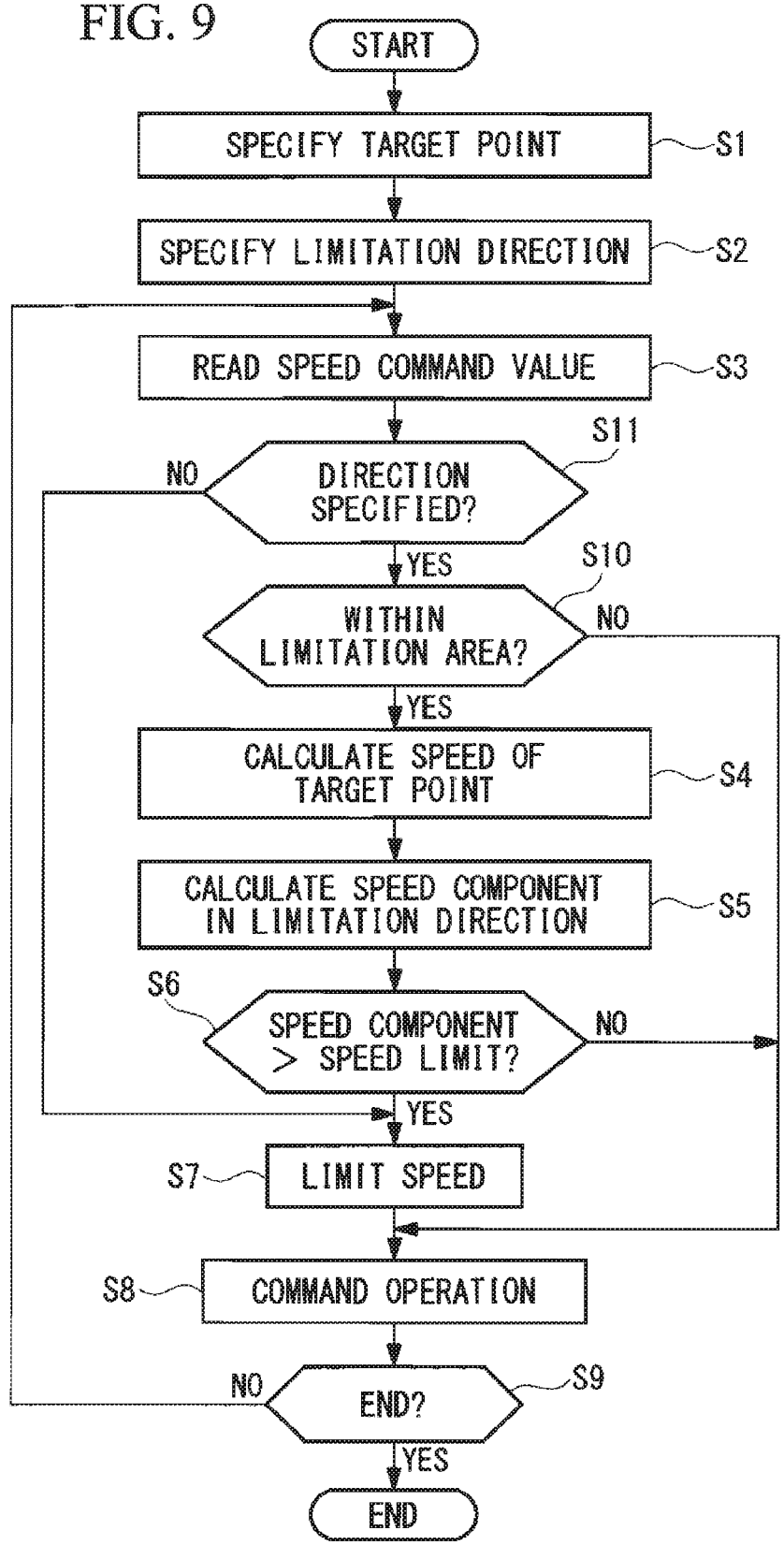
FIG. 9 is a flow chart for explaining the second modification of the robot control method shown in FIG. 5.

In addition, as shown in FIG. 8, a specification determiner 17 may be provided which determines if the limitation direction specifier 12 made a specification about the direction in which the motion speed is limited. As shown in FIG. 9, if there is a specification about the limitation direction, the speed limiter 14 limits the motion speed in the limitation direction; otherwise, the motion speed is limited in all directions (Step S11).

Consequently, when the robot 2 and a person conduct work closely, a contact between the robot 2 and the person can be avoided more reliably even without a specification about the direction in which the motion is limited.

Figure 10:
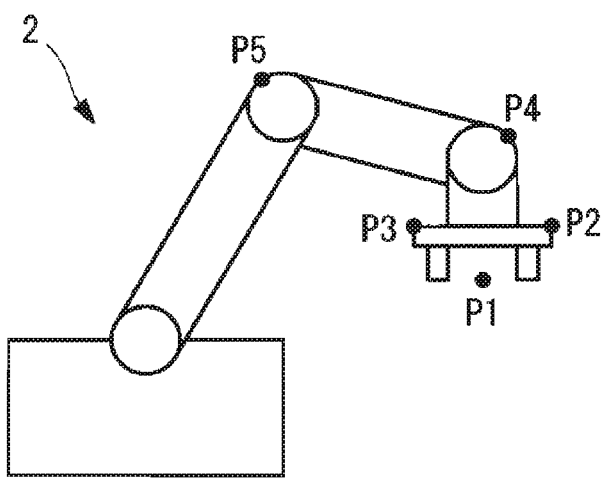
FIG. 10 is a diagram showing a modification of a target point provided to the robot.

Although this embodiment shows the target point P1 in the form of a TCP which is a control point of the robot 2, this is not necessarily the case and any point may be specified as the target point P1. Moreover, as shown in FIG. 10, two or more target points P1, P2, P3, P4, and P5 may be specified and the speed may be limited for the target points P1, P2, P3, P4, and P5 such that the motion speed in the limitation direction becomes at or below the speed limit.

Figure 11:
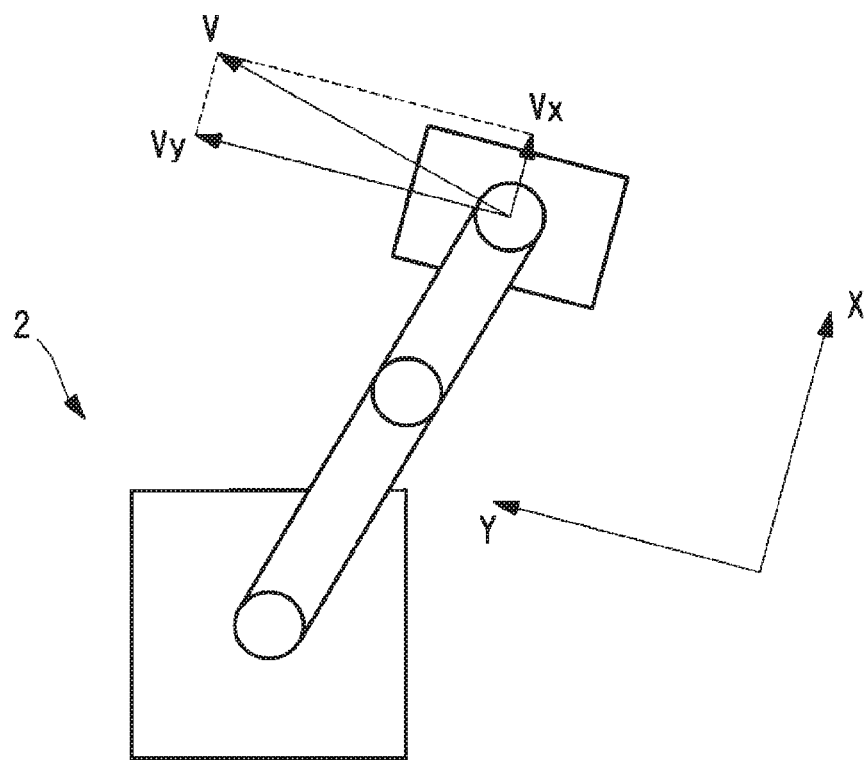
FIG. 11 is a plan view of a modification of a rectangular coordinate system provided for specifying a limitation direction for motion speed.

Moreover, a limitation direction in which the speed is limited is not necessarily based on the reference coordinate system of the robot 2 and may be any coordinate system specified by the operator as shown in FIG. 11. Specifying a coordinate system according to the shape or direction of the limitation area facilitates the specification of the limitation direction. In the drawing, V is the speed component of a specified coordinate system, $V_x$ is the speed component of the specified coordinate system in the X direction, and $V_y$ is the speed component of the specified coordinate system in the Y direction.

Figure 12:
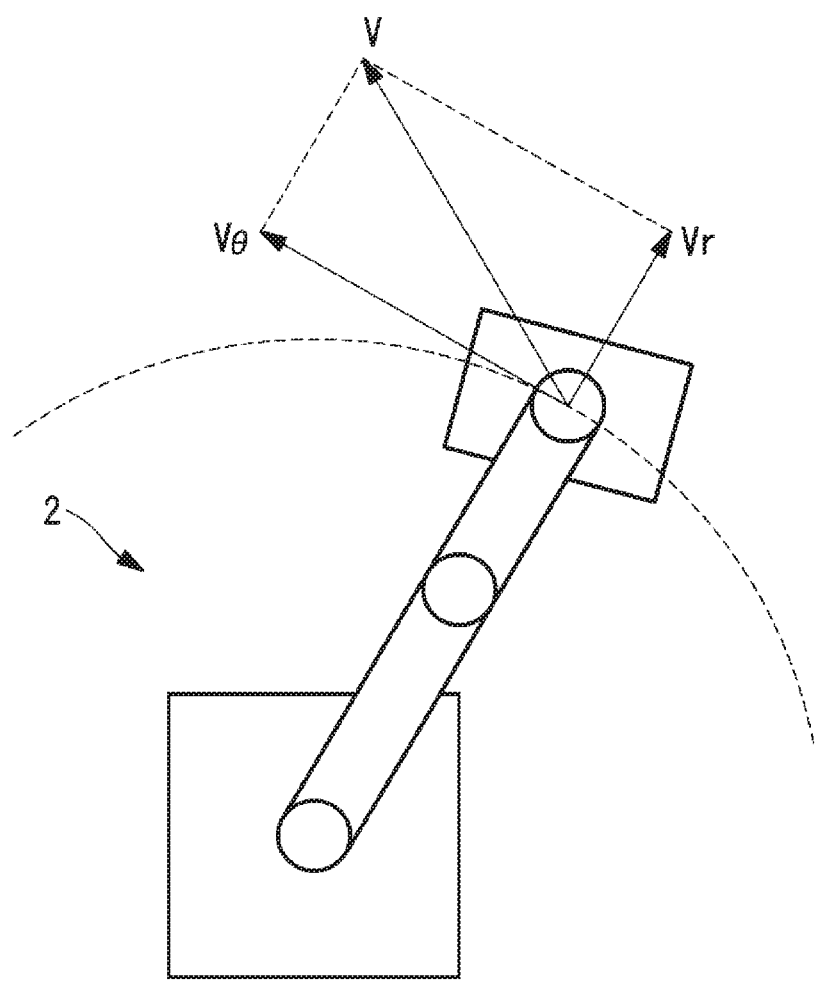
FIG. 12 is a plan view of an example of a cylindrical coordinate system provided for specifying a limitation direction for motion speed.

The coordinate system is not limited to a rectangular coordinate system and may be a cylindrical coordinate system for specifying a limitation direction as shown in FIG. 12. In the drawing, V is the speed component of a cylindrical coordinate system, $V_r$ is the speed component in the radial direction r in the cylindrical coordinate system, and $V_\theta$ is the speed component in the tangent direction $\theta$ in the cylindrical coordinate system.

In addition, there are an operation mode in which the speed is limited and an operation mode in which the speed is not limited. The operation mode can be switched between them by the operator or the sensor or the like on the safety fence.

From the above-described embodiment, the following invention is derived.

One aspect of the present invention is a robot control device including: a speed calculator that calculates the speed of at least one target point of a robot operating according to an operation program, on the basis of a speed command value written in the operation program; a limitation direction specifier that specifies a direction in which the speed of the target point is limited; a speed limit component calculator that calculates, out of the speed of the target point calculated by the speed calculator, a speed component in the direction specified by the limitation direction specifier; and a speed limiter that limits, only upon motion exceeding a prespecified speed limit, the motion speed of the robot such that the speed component calculated by the speed limit component calculator becomes at or below the prespecified speed limit.

In this aspect, the limitation direction specifier specifies the direction in which the speed is limited, the speed of at least one target point of the robot is calculated by the speed calculator according to the operation command value for each operation command written in the operation program, and out of the calculated speed, the speed component in the direction specified by the limitation direction specifier is calculated by the speed limit component calculator. Further, the speed limiter determines whether the calculated speed component of the motion exceeds a prespecified speed limit. If it exceeds the speed limit, the robot motion speed is limited only for that motion such that it becomes at or below the speed limit.

Thus, even if the robot is located in an area close to a person, the robot motion speed is limited not uniformly but only for motion with a speed component that is in the direction specified by the limitation direction specifier and exceeds the speed limit, thereby preventing excess limitation on robot motion speed and improving robot work efficiency.

In this aspect, a limitation area specifier and a position determiner may be further included. The limitation area specifier specifies a limitation area in which the motion speed of the robot is limited. The position determiner determines whether the target point of the robot is located in the limitation area. If the position determiner determines that the target point of the robot is located in the limitation area, the speed limiter limits the motion speed of the robot.

Hence, if the position determiner determines that the target point of the robot is located in the limitation area specified by the limitation area specifier, the motion speed of the robot is limited. In other words, if the target point of the robot is out of the limitation area, the motion speed is not limited, thereby further limiting the cases where the robot motion speed is limited and improving robot work efficiency.

Moreover, in this aspect, the limitation direction specifier may specify a direction in which the speed is limited, according to a prespecified coordinate system.

Accordingly, a direction in which the speed is limited is specified according to the coordinate system of robot motion, a given coordinate system such as a coordinate system defined by the operator, or any form of coordinate system such as a rectangular coordinate system or a cylindrical coordinate system. Since speed is limited according to a coordinate system based on the area in which speed should be limited and the robot axis configuration, the direction in which the speed should be limited can be easily specified.

In this aspect, a specification determiner may be further included which determines whether there is a specification about a direction in which the speed is limited, the specification being made by the limitation direction specifier. If the specification determiner determines that there is no specification about the direction in which the speed is limited, the speed limiter may limit the motion speed of the robot such that all motion of the robot becomes at or below the prespecified speed limit.

Accordingly, if the specification determiner determines that there is no specification about a direction in which the speed is limited, all motion speed of the robot is limited to at or below the speed limit. Consequently, when the robot and a person conduct work closely, a contact between the robot and the person can be avoided more reliably without a specification about the direction in which the motion is limited.

Further, in this aspect, the target point may be a control point of the motion of the robot.

Accordingly, in general, the speed calculator can calculate the speed of the target point more easily according to the operation program generated using the control point as a reference.

Another aspect of the present invention is a robot control method including: a speed calculating step of calculating the speed of at least one target point of a robot operating according to a taught operation program, on the basis of a speed command value written in the operation program; a limitation direction specifying step of specifying a direction in which the speed of the target point is limited; a speed limit component calculating step of calculating, out of the speed of the target point calculated in the speed calculating step, a speed component in the direction specified in the limitation direction specifying step; and a speed limiting step of limiting, only upon motion exceeding a prespecified speed limit, the motion speed of the robot such that the speed component calculated in the speed limit component calculating step becomes at or below the prespecified speed limit.

The invention claimed is:

1. A robot control device comprising:
   a speed calculator that calculates a speed of at least one target point of a robot operating according to an operation program, on the basis of a speed command value written in the operation program;
   a limitation direction specifier that specifies a direction in which the speed of the at least one target point is limited;
   a speed limit component calculator that calculates, out of the speed of the at least one target point calculated by the speed calculator, a speed component in the direction specified by the limitation direction specifier; and
   a speed limiter that limits, only upon motion exceeding a prespecified speed limit, a motion speed of the robot such that the speed component calculated by the speed limit component calculator is less than or equal to the prespecified speed limit.

2. The robot control device according to claim 1, further comprising:
   a limitation area specifier that specifies a limitation area in which the motion speed of the robot is limited; and
   a position determiner that determines whether the at least one target point of the robot is located in the limitation area, wherein
   if the position determiner determines that the at least one target point of the robot is located in the limitation area, the speed limiter limits the motion speed of the robot.

3. The robot control device according to claim 1, wherein the limitation direction specifier specifies the direction in which the speed of the at least one target point is limited, according to a prespecified coordinate system.

4. The robot control device according to claim 1, further comprising:
   a specification determiner that determines whether there is a specification about the direction in which the speed of the at least one target point is limited, the specification being made by the limitation direction specifier,
   wherein if the specification determiner determines that there is no specification about the direction in which the speed of the at least one target point is limited, the speed limiter limits the motion speed of the robot such that all motion of the robot is less than or equal to the prespecified speed limit.

5. The robot control device according to claim 1, wherein the at least one target point is a control point of the motion of the robot.

6. A robot control method comprising:
   a speed calculating step of calculating a speed of at least one target point of a robot operating according to an operation program, on the basis of a speed command value written in the operation program;
   a limitation direction specifying step of specifying a direction in which the speed of the at least one target point is limited;
   a speed limit component calculating step of calculating, out of the speed of the at least one target point calculated in the speed calculating step, a speed component in the direction specified in the limitation direction specifying step; and
   a speed limiting step of limiting, only upon motion exceeding a prespecified speed limit, a motion speed of the robot such that the speed component calculated in the speed limit component calculating step is less than or equal to the prespecified speed limit.

* * * * *